June 7, 1966 J. R. SINGER 3,255,437

ELECTRONIC RECOGNITION

Filed Jan. 23, 1961 4 Sheets-Sheet 1

INVENTOR.
JEROME R. SINGER

BY

Lippincott, Ralls & Hendricson
ATTORNEYS

INVENTOR.
JEROME R. SINGER
BY
Lippincott, Ralls & Hendricson
ATTORNEYS

INVENTOR.
JEROME R. SINGER
BY
Lippincott, Ralls & Hendricson
ATTORNEYS

INVENTOR.
JEROME R. SINGER
BY
Lippincott, Ralls & Hendricson
ATTORNEYS 3,255,437

ELECTRONIC RECOGNITION

Jerome R. Singer, Berkeley, Calif., assignor of one-fourth to John W. Ralls and Alvin E. Hendricson, San Francisco, Calif.

Filed Jan. 23, 1961, Ser. No. 84,280
9 Claims. (Cl. 340—146.3)

The present invention relates to a method and system for the recognition of characters electronically to thereby provide a simulation of visual recognition.

Recognition may be defined as the obtaining of a specific, predetermined output response for a given input character, and there is herein provided for the interpretation of input forms and the provision of a unique standardized output for each. In order to approximate or approach the human recognition system, it is necessary to advance far beyond conventional "reading" machines. Thus, for example, variations in size of a form or character cause little or no confusion in human recognition of the shape thereof, while machines fail entirely to accommodate such variations. Likewise, off-center alignment and tilting of characters normally confuse conventional identifying or reading apparatus, although same does not prevent human recognition.

The present invention, then, extends a large step beyond known and accepted devices and methods for recognition in that there is herein provided at least an approximation of the human recognition system. Electronics are employed herein to perform at least some of the recognition processes of humans, and of substantial importance in this respect is the attainment of size variance independence. Also attained hereby is a freedom from the necessity of precise centering of forms for recognition, and at least a substantial tolerance for angular displacement or tipping of forms to be recognized in the field of vision hereof. The foregoing will be seen to be quite foreign to computers, or the like, which are known to be capable of scanning symbols which are standardized with respect to placement, size, and design for producing specific read-out patterns. It is herein provided that recognition shall be accomplished through certain transformations, which may be somewhat analogous to humans, coupled with memory information to provide unique recognition signals extending the scope of recognition systems far beyond present limits. There is herein produced, by such as a matrix of light-sensitive means, signals which are differentiated to provide image signals. Size invariance recognition is attained by delay and transformation of the image signals, and coincidence handling of such delayed signals. As recognition is based upon similarities between observation and retained information, the coincidence procedure is herein provided with "learned" or built-in information to afford grounds for comparison to achieve output recognition signals. Automatic object centering is readily and advantageously incorporated herein through the minimization of deviations from equality of sector signals. Tolerance for limited figure rotation is attained by employing a "slackness" in the differentiation and coincidence processes, without unduly sacrificing resolution. A second means of rotation, which is unlimited, consists of mathematically manipulating the number representing the figure image.

A large number of applications are possible for this invention, such as, for example, in the reading and even translating of printed matter such as books. Inasmuch as images and objects of all configurations are capable of recognition with this invention, no limit to symbols or figures is present, and the identification of persons, patterns, faults, and the like, is also possible. Thus, a stored or memorized program of fingerprints or facial features may be utilized herewith to provide identification of people, as in security or police work. For the storage of large quantities of memory information it is advantageous to utilize such as a digital computer herewith, and to make comparisons between stored codes and image codes produced from images viewed. Such an arrangement may also provide for the storage of image codes which find no coincidence in the memory information already stored, so that the invention then "learns" by viewing. Additional applications which may be envisioned with such an arrangement include production control by visual inspection, automatic piloting, wherein navigational decisions are provided upon the basis of stored and viewed radar patterns, and utilization of the system as an automatic radar monitor or watcher, as well as many others.

It is an object of the present invention to provide improved method and apparatus for accomplishing recognition processes.

It is another object of the present invention to provide an improved system for producing characteristic signals in response to exposure to forms or characters.

It is a further object of the present invention to provide an improved system producing characteristic output signals independent of the size of the figure or character viewed.

It is yet another object of the present invention to provide method and means for electronically producing recognition signals for characters or symbols, substantially independent of the size and placement of such characters or symbols.

It is a still further object of the present invention to provide method and means for recognition of figures, despite angular displacement of such figures.

Various other objects and advantages of the present invention will become apparent to those skilled in the art from the following description of the present invention. Although the invention is herein described in connection with particular preferred steps of the process hereof, and in connection with certain electronic system circuitry, it is not intended to limit the invention by the terms of this description, but instead, reference is made to the appended claims for a precise delineation of the true scope of the invention.

The invention hereof is hereinafter described in connection with the accompanying drawings, wherein.

The present invention, in brief, provides for the initial interception of a light image by a matrix of light-responsive means, such as some type of photoreceptors as, for example, small photovoltaic cells. The output of each of these individual photoreceptors of the matrix is differentiated to prdouce signals corresponding to the edges of an image, i.e., the portions of the matrix between light and dark areas. Inasmuch as operation upon continuous direct current signals is somewhat difficult, it is preferable to provide for pulsed operation, and this may be accomplished in a variety of ways as, for example, by periodically activating the photoreceptors, employing a rapid-acting shutter in front of the photoreceptors, or electrically chopping the direct current signals from the receptors. At any rate, there is herein produced pulsating signals from the photocells or photoreceptors, which are passed through conductors, and it may then be considered that there is attained an "image signal in fiber space," in analogy to the human eye. Size invariance is attained by a suitable transformation to equate all equivalent characters. Although alternatives are possible in this respect, one manner of attaining such size invariance is to transmit the signals unidirectionally outwardly or inwardly from the points of initiation by interconnecting the above-noted conductors so that all signals of a single image ultimately appear upon an outer or inner ring of conductors. A further transformation is then accomplished through a delay transformer, and recognition is attained by comparison of the delay signals with memory information. This latter step is accomplished herein through the utilization of appropriately wired coincidence circuitry, wherein the interconnections represent the memory or input information against which the images are compared to produce recognition signals.

Figure 1:
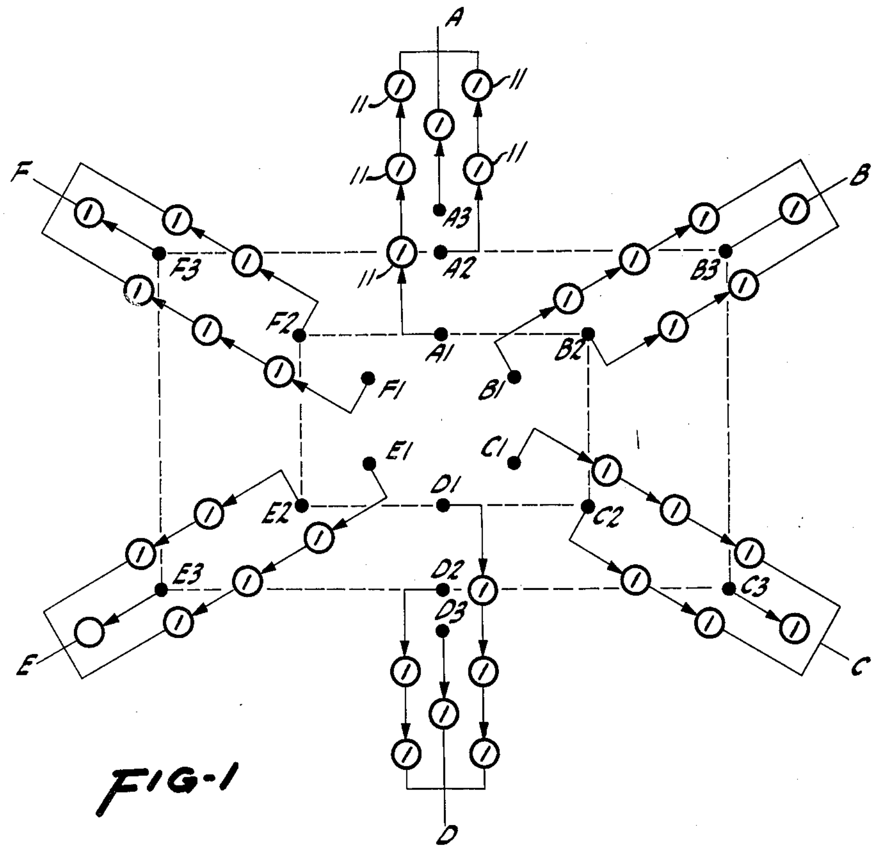
FIG. 1 is a representation of a delay transformer geometrically arranged to indicate the overall system layout and employed in a general description of the invention.

Further to the above brief description of the present invention, reference is made to FIG. 1 and to a specific example of electronic recognition, in accordance with the present invention. There are illustrated in FIG. 1 a plurality of sets of conductors emanating from photoreceptors and denominated in the figure by the letters A through F. Thus, the first set will be seen to include the conductors A1, A2, and A3, with the other sets similarly constituted and arranged in angularly offset relation with each of the conductors of the single set emanating from a central point. In actuality, the simplified showing of FIG. 1 relates to the delay transformation of the present invention, it being assumed that suitable means are provided for periodically activating the photoreceptors, so that electrical pulses are transmitted through the conductors above identified.

The individual conductors A1, A2, and A3 of the single set at the top of FIG. 1 are electrically connected together through delay circuits 11. Each of the circles 11 of FIG. 1 is illustrative of a unit delay in the transmission of signals, and may either comprise a lumped or distributed delay such as, for example, a delay line. It is however particularly noted that each of the elements 11 introduces identical delays in the passage of signals. Considering further the conductors A1, A2, and A3, it will be seen that A1 is connected through some three delay units 11 to a common outlet conductor A, while the conductor A2 is connected through two delay units 11 to the same conductor, and the final conductor A3 is connected through one delay unit to the output conductor. The conductors A1, A2, and A3 are also noted to be situated at correspondingly greater distances from a central point of an overall delay transformer. This is herein so illsutrated as a graphic representation of the positions of the photoreceptors in the matrix to which the individual conductors of this circuit are connected.

Considering now the recogntion of a figure with the exemplary circuitry of FIG. 1 described above, let it be assumed that photoreceptors are activated to produce pulses in the conductors A1, B2, C2, D1, E2, and F2. With the graphic layout of FIG. 1, it will be seen that energization of such conductors is representative of a rectangle having a length which is twice the width. The electrical pulse signals appearing on these conductors will be seen to move outwardly so as to ultimately energize each of the conductors A to F. However, there are introduced different time delays so that the conductors A to F will then be energized at different points in time. The delay transformer operates to transform space variations to time variations. In the specific example above, it will be seen that the conductors B, C, E, and F are energized by a pulse after two incremental time delays, inasmuch as two time-delay units are interposed between the second conductors of these sets and the outlet conductor. The output or outlet conductors A and D are, however, energized by a pulse after three incremental time delays. Recognition of this particular figure may be accomplished with circuitry such as that illustrated in FIG. 2.

Figures 2, 3:
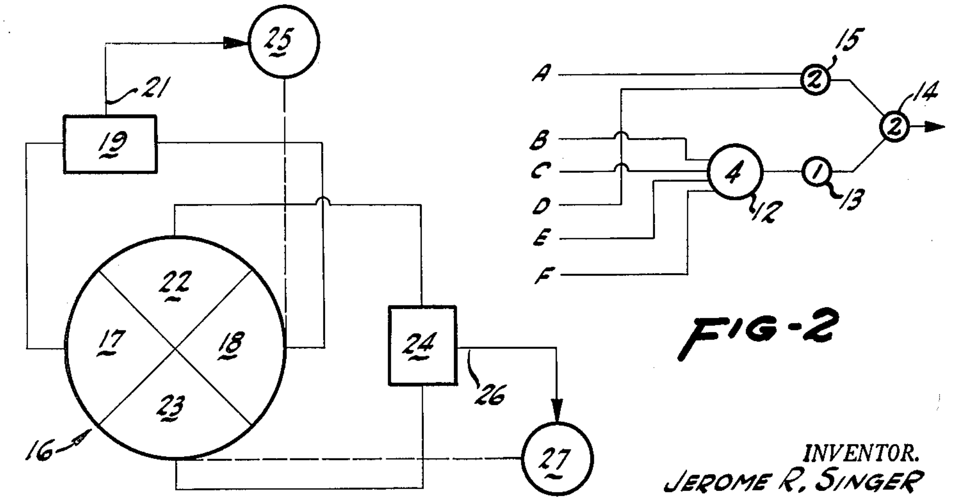
FIG. 2 is a coincidence system which may be utilized with the delay transformer of FIG. 1 for size invariant recognition of a rectangle.
FIG. 3 is a schematic representation of a centering arrangement for the system hereof.

This rectangle will be identified by coincident signals in the lines B, C, E, and F, followed one time delay by coincident signals in lines A and D. Thus, there is shown in FIG. 2 the connection of conductors B, C, E, and F to a coincidence circuit 12 having the numeral 4 therein as a connotation of four coincident input signals producing a single output signal. The output of this quadruple coincidence circuit 12 is then delay one incremental unit by the delay circuit 13, and applied to a further coincidence circuit 14. The lines or conductors A and D are both connected to a coincidence circuit 15 having a 2 therein as an indication that two coincident input pulses will produce an output therefrom. The output of this coincidence circuit 15 is likewise applied to the coincidence circuit 14, and consequently, there is produced an output signal therefrom upon coincident input signals thereto. This output signal is indicative of the reading or viewing of a rectangle of the above-noted configuration and size.

Consider now the viewing by the invention of a rectangle of like configuration as discussed above, but of large physical dimensions. In the instance wherein such a rectangle has twice the area and is centered with respect to the photoreceptor matrix, as discussed in greater detail below, there will be produced an energization of conductors A2, B3, C3, D2, E3, and F3. Under this circumstance, the delay transformer of FIG. 1 will serve to produce output pulses in lines B, C, E, and F after one incremental time delay, inasmuch as the above-noted conductors are connected through a single time-delay circuit to the output lines therefrom. The other output lines A and D will be seen to be energized after two incremental time delays, inasmuch as the conductors A2 and D2 are connected through two incremental time-delay circuits to the respective output lines A and D. In this instance, then, the recognition circuit of FIG. 2 is equally applicable because the lines B, C, E, and F are simultaneously energized to produce a coincidence in the circuit 12, and the lines A and D are simultaneously energized one incremental time delay later to produce a coincidence in the circuit 15. The output of circuit 12 is delayed an incremental time unit by the circuit 13, and thence applied to the coincidence circuit 14 at the same time as the output from the circuit 15. There is consequently produced a coincidence in the circuit 15, and there results a recognition signal for a rectangle having a length which is twice the width, in the same manner as there was produced such a recognition signal with a small rectangle, as discussed above.

Figure 4:
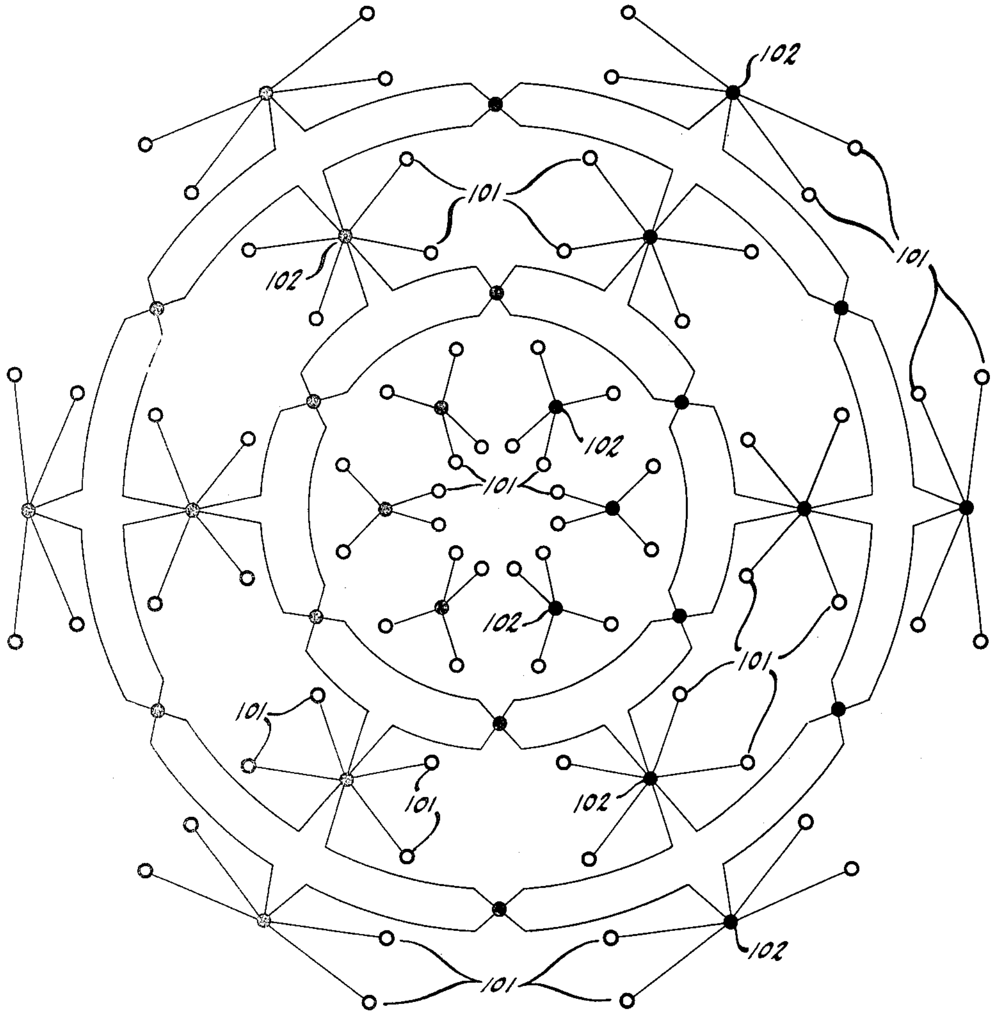
FIG. 4 is a diagram of a photoreceptor matrix including differentiation connections.

It will be appreciated that the above description is simplified to the extent that only a minimum number of conductors are illustrated and discussed, and furthermore, that these conductors are particularly connected in delay circuitry to produce recognition signals for rectangles. In actual practice wherein the invention is adapted to recognize a large multitude of different characters and figures, there are, of course, provided a multitude of additional connections and delay lines. The circuitry of FIGS. 1 and 2 is merely exemplary of the delay transformation and comparison circuitry of the present invention, whereby recognition signals are attained. In particular, the above description is directed to the explanation of size invariant recognition. The same general description is equally applicable to size invariant recognition for any type of figure or character, it only being required that the conductors from the photoreceptors be appropriately connected in delay circuitry and coincident circuitry to attain the recognition signals. Possibly a clearer understanding of a method of obtaining a size-invariant pulse representation of an image may be obtained by considering an image projected upon a polar array of photoreceptors, as generally illustrated in FIG. 4. In the matrix of FIG. 4, further discussed below, the photosensitive area of each bank of photoreceptors is made proportional to the radial distance from the center of the array. Thus, with approximately centered images, a larger image will stimulate the same radial lines with the same pulse-time relationships between radially connected portions as a smaller image of like configuration.

Quite clearly, a complete recognition system involves a much larger multitude of elements than that illustrated and described above; however, the basic principles remain the same. Of particular interest with regard to the recognition of symbols and figures is the necessity of some centering operation. In common with the human eye, it is necessary for the photoreceptor matrix to be somehow aligned with the figure or character being viewed for recognition. In the present invention, this may be rather readily accomplished by a minimization of difference signals. Attention is invited in this respect to FIG. 3, which is a generalized illustration of a photoreceptor matrix 16 having a large plurality of individual photocells, and divided into equal quadrants, as illustrated. By comparing the summation of signals from oppositely disposed quadrants and reducing the results of this comparison to a minimum through movement of the matrix, it will be seen that a centering operation is performed. Thus, as illustrated in FIG. 3, the two opposite quadrants 17 and 18 may both be connected to a bridge circuit 19 producing a difference signal from a comparison of the total photoreceptor signals in the two separate quadrants. This difference signal appearing in the line 21 may be employed to operate a servomechanism 25 connected to the matrix for pivoting same about a vertical axis, in order to achieve an equality of signals in the two quadrants 17 and 18. Similar connections of the alternate quadrants 22 and 23 to a bridge circuit 24 may be employed to produce a difference signal in the line 26 that controls a servomechanism 27 for pivoting the matrix about a horizontal axis. In this manner a relatively simple centering operation may be performed, and it may be preferable to precede the recognition procedure by the centering operation in order to simplify the learning of recognition procedures. It is, however, possible to accomplish simultaneous recognition and centering. It will be appreciated that exact centering of characters without symmetry is not possible; however, the above-outlined method serves to provide a unique placement for each image in the photoreceptor matrix, so that memory information may be built in to readily identify such characters in their unique positions as attained by the centering operation. Various types of servomechanisms may be employed in driving the matrix to appropriately align same in centered relationship with images being viewed, and thus no details of this structure or circuitry are included herewith.

A recognition problem allied with the centering operation discussed above, is the necessity for performing scanning operations to recognize overly large figures or characters. Not only is it necessary for the system hereof to scan a page, or the like, for identification of subsequent figures or symbols printed thereon, but also the possibility arises that certain symbols or characters viewed by the matrix may have a larger size than the matrix itself. In this instance it will be appreciated that the above-noted centering operation will be performed to dispose one portion of the image border in centered relationship with the matrix. In this connection there is provided auxilary circuitry for storing the partial recognition afforded by this initial information, and the centering or scanning operation continues for a complete traversal of the outline of the image, with information being continuously supplied to storage circuitry provided. It is then necessary to compare this stored information with memory or learned information built into the system, in order to provide a recognition comparison. While the foregoing may be relatively readily accomplished for characters or symbols having straight lines, such as a rectangle, some complication occurs in attempting to scan for recognition more complicated figure configurations. From a practical viewpoint, it is possible to provide an interaction between the centering and scanning servomechanisms and the recognition system. In particular, this is of importance in connection with the recognition of a plurality of spaced symbols, wherein the recognition procedure involves the production of a signal to actuate the scanner for movement to a subsequent figure following recognition of the one being viewed.

The present invention will be seen from the above brief discussion to provide for the differentiation of light-responsive signals emanating from a matrix, or the like, to thereby produce electrical signals indicative of the presence of borders between light and dark. These differentiated signals are then transformed into delay space wherein they expand in time, so that there is attained a size invariance. This invariance occurs from the fact that signals produced from points closer to the center of the image viewed will reach the same outer point in time with only a time difference. Actual recognition is then achieved by utilization of time coincidence operations, wherein a comparison is made with the electrical signals produced as above noted, with memory codes.

Figure 5:
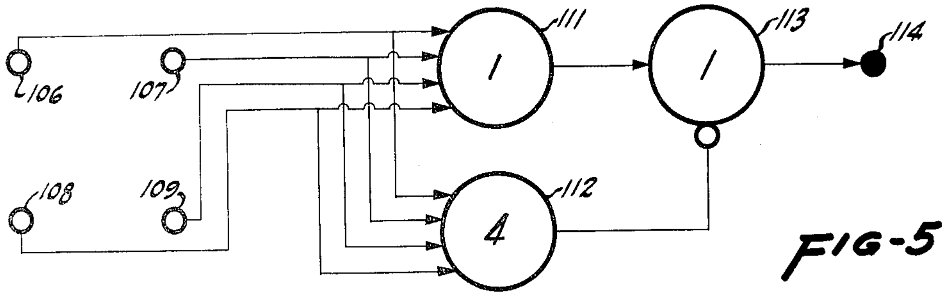
FIG. 5 is a differentiation circuit as may be iteratedly employed in the matrix of FIG. 4.

Although it is not herein intended to fully illustrate and describe each of the individual repetitive elements which may be employed in a complete recognition system for such as the alphabet, there are indicated in certain of the drawings a somewhat more complex system than that described above. Thus, there is shown in FIG. 4 some 72 photoreceptors 101, which are schematically illustrated as being connected in groups of four for differentiation at the optic fibers 102. Further differentiation of groups of signals is also provided, as indicated. In connection with this differentiation, there may be employed a variety of circuits or approaches to achieve the necessary result, and FIG. 5 illustrates a simple, logical arrangement for obtaining one output pulse per unit of time when one, two or three of the four photoreceptors are stimulated with light, while the others are not. The simple arrangement of FIG. 5 will be seen to provide for the connection of photoreceptors 106, 107, 108, and 109 to the input of a unit delay circuit 111, which produces a standard output pulse at a time $t+\Delta t$ when stimulated with a standard impulse at time $t$ from any of the photoreceptors. These photoreceptors are also all connected to the input of an AND circuit 112, which produces a standard output pulse at a time $t+\Delta t$ after stimulation by four input pulses within a specified period of time $\delta t$. One further circuit element of this differentiating system is shown at 113 as comprising a bridge organ which provides a standard output pulse at a time $t+\Delta t$ when one input line is stimulated and the other is not stimulated during an interval of time $\delta t$. The symbol employed for this circuit will be seen to include a small circle below a large one, and the small circle is indicative of the inhibitory input line. Thus, it will be seen that FIG. 5 serves to produce an output pulse at point 114 upon energization of less than all four photoreceptors. Should all four photoreceptors be energized, the circuit 112 would pass a signal to inhibit the passage of the signal through the circuit 113. It is herein contemplated that some sort of differentiation, such as that briefly described above in connection with FIG. 5, is employed in each group of photoreceptors, such as the groups of four illustrated in FIG. 4 of the drawing. Thus, the heavy black dots of FIG. 4 are considered to include the requisite differentiation such as that described above.

Figure 6:
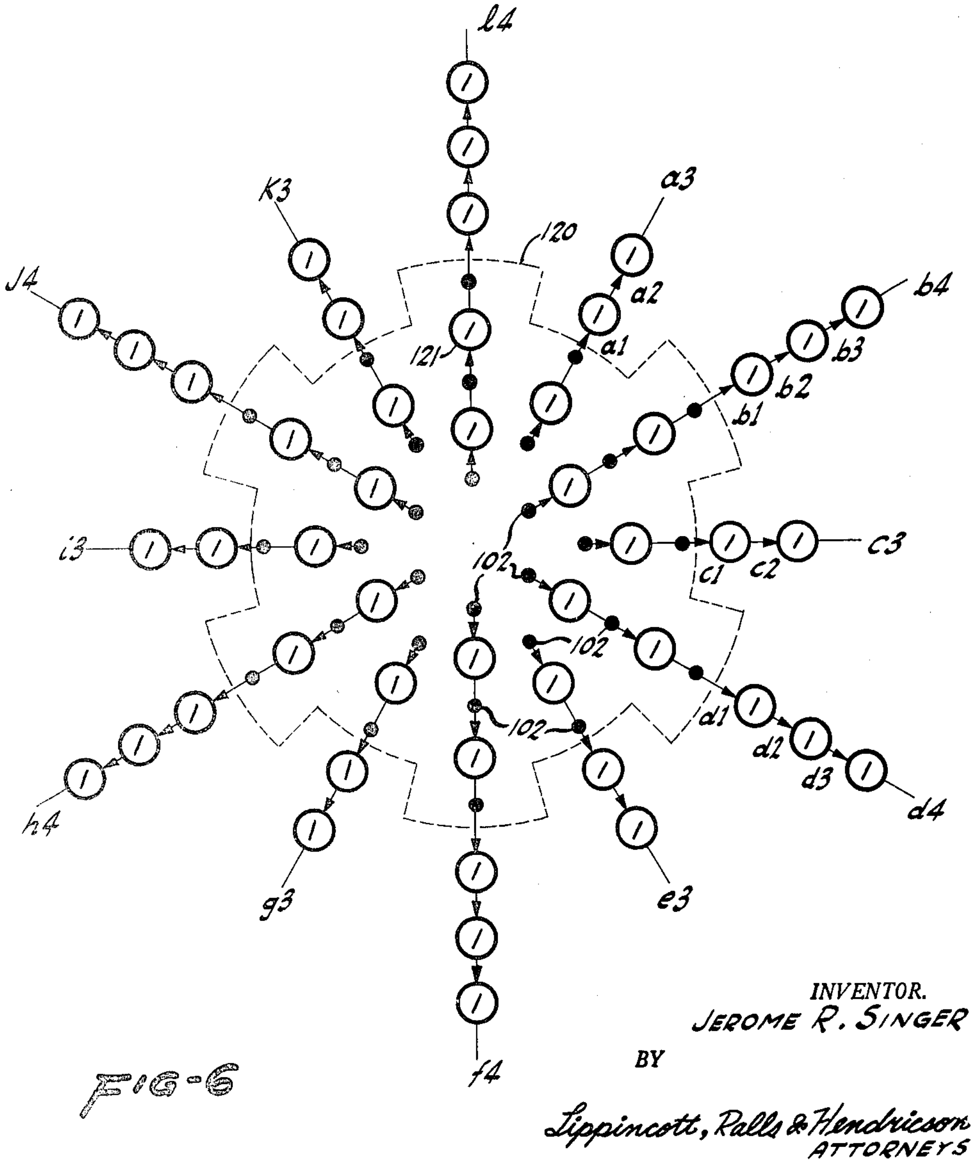
FIG. 6 is a representation of delay transformation in accordance with the invention.

Following differentiation, there is produced a delay transformation, as briefly discussed above, and in this connection attention is invited to FIG. 6 of the drawing as an indication of an appropriate delay transformer system applicable for utilization with the photoreceptor array and differentiation of FIG. 4. In FIG. 6 the elements bounded by the dashed line 120 represent the delay transformer, and same will be seen to include the provision of simple unit delay circuits 121 interconnecting optic fibers 102. For simplicity, it is assumed in connection with this illustration and others in the present disclosure, that each of the individual circuits of the present invention is unidirectionally conductive, and furthermore, that each produces pulse signals of sufficient amplitude to drive any number of successive circuits. While in practice this latter assumption may not be entirely realized, it will be appreciated that there is only required the provision of appropriate amplification means to attain this situation. Referring again to FIG. 6, it will be seen that there are provided therein some thirty optic fibers corresponding to the fibers illustrated in FIG. 4. For ease of understanding, the delay transformer has been drawn to indicate the like relationships, both spatial and time-wise, between the signals produced by the photoreceptors, and differentiated as noted above. It will, of course, be appreciated that the physical geometry of the delay transformer is in no way limiting, and that consequently it is not necessary to lay out this system in any sort of circular pattern of the type illustrated. Exteriorly of the dashed line 120 in FIG. 6, may be considered delay space, wherein the pulse signals expand in time and such signals arrive in delay space by virtue of having been twice transformed from an optical image—once by differentiation, and a second time by delay transformation.

Considering further the delay space of the present invention, it will be appreciated that in such space a symbol viewed by the invention is stretched or enlarged in a very organized dilatation. This is accomplished by projecting the symbol in a stepwise increasing size along a set of axes which are pulse carriers, while preserving the shape of the symbol. Each pulse in a single line carries a resolved element of the symbol and the pulse travels outward on the line at a speed which depends upon the propagation characteristics of the line and the delay elements. It will be appreciated in this respect that the pulse lines may employ distributed parameters so as to thereby comprise conventional delay lines. The symbol or symbols transformed into delay space have rather particular properties. Thus, in this example, the pulse length emitted by an activated element has a fixed length, and each delay element regenerates the incoming pulse with a fixed delay time equal to the delay time of all other delay elements. The delay elements, furthermore, are substantially synchronized within concentric rings about the center of the delay space, in order to preserve the shapes of symbols in time. The same effect may be achieved by utilizing non-uniform photoreceptor spacing or density in the matrix, and compensating non-uniform delays so that delay space receives signals in an equilivalent manner. It will be seen that symbols may be represented in the delay space by connecting all the pulses representing elements of the symbols during a particular instant of time. It is, of course, necessary that a given image appearing in the optic fiber space and also in delay space be free of interference from earlier and later images. This is accomplished, in part, by periodic activation of the photoreceptors, by providing circuitry in which the signal flow is unidirectional from the receptors through the differentiation system along the optic fibers, and furthermore, that the delay time $\Delta t$ always be greater than the signal pulse length $\Delta L$. By the provision herein of delay space as above described, the problem of symbol recognition will be seen to be reduced to the problem of providing time coincidence between image signals and stored information.

Recognition information or memory may be built into coincidence circuitry so that the occurrence of particular coincident signals in delay space will automatically produce the recognition signal for the particular symbol represented thereby. In this connection, it will also be seen that there is provided an automatic independence of the size of the symbol being viewed. All symbols, regardless of the size of the original image projected on the photoreceptors, must traverse delay space so that it is only a question of relative times for incremental symbol signals to reach an outer level thereof. There is also provided in this manner a certain invariance for tilting of the symbol being viewed. Inasmuch as the individual pulses have a certain pulse length, it will be appreciated that pulse coincidences then have an uncertainty equal to this length. This uncertainty then provides for accommodating a certain limited tilt or disorientation of the symbol with respect to the photoreceptor array. Additionally, further tilt tolerance may be provided by the utilization of somewhat less than a complete coincidence to activate the recognition signal output. Normally, the signals produced by viewing a symbol are redundant in information content, so that it is not necessary to require a complete coincidence of all possible signals to produce recognition. By employing a large majority of the available signal pulses for coincidence, there is provided a further tolerance to tilting and also a tolerance to symbol distortion, while yet attaining recognition signals.

In FIG. 6 the pulse lines are indicated by the small letters *a* to *l*, with appropriate unidirectional delay units inserted in these lines, so as to thereby provide for pulses at different positions in delay space, as indicated by the nomenclature of the drawing. Thus, for example, considering the pulse line *a*, it will be seen that in the delay space a pulse therein will successively appear at *a*1, *a*2, *a*3, etc. at successive time intervals. This nomenclature is employed in FIG. 7 to indicate one possible coincidence system for the recognition of certain symbols. It is to be appreciated that in connection with the memory portion of the present invention, no attempt is made herein to set forth any more than exemplary recognition circuitry which may be employed in connection with the delay space signals herein produced.

Figures 7, 8, 9:
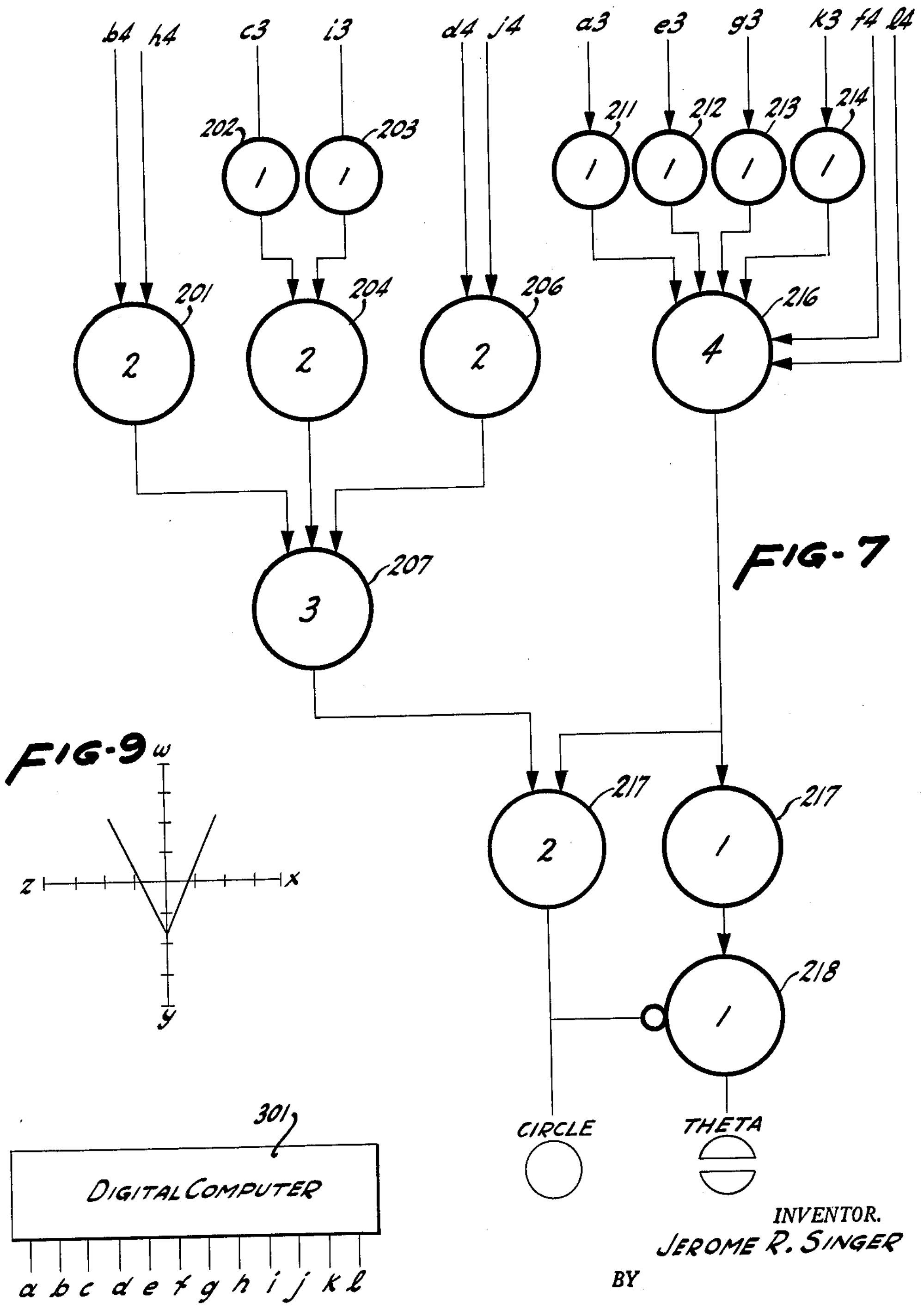
FIG. 7 is a coincidence circuit that may be employed with the circuit of FIG. 6 in the recognition of the symbols 0 and $\theta$.
FIG. 8 is an illustration of generalized delay transformation connections to such as a digital computer.
FIG. 9 is a diagrammatic representation of an image for binary coding.

One possible coincidence system, as illustrated in FIG. 7, is adapted to produce recognition signals for circles and also for an alternative but similar figure, which we may term $\theta$, these being illustrated at the bottom of this figure. It will be seen that the symbol $\theta$, herein employed as exemplary, is circular in exterior configuration with the difference that a line passes through the circle. Considering the illustrative circuitry of FIG. 7, it will be seen that the upper left-hand portion hereof provides for the utilization of pairs of input pulse lines, and associated coincidence circuitry to provide recognition of a portion of a circle. Thus, pulses from *b*4 and *h*4 are applied to a coincidence circuit 201, which produces an output from coincident input signals. Signals *c*3 and $i3$ are each passed through unit delay circuits 202 and 203, and thence into a coincidence circuit 204. Pulse signals $d4$ and $j4$ are applied to a coincidence circuit 206, and the output signals from each of the coincidence circuits 201, 204 and 206 are applied to a triple coincidence circuit 207. Please note with respect to this and other illustrations that the coincidence circuits are each illustrated with the numeral therein identifying the number of required coincident input pulses to produce an output signal, and furthermore, that each of the coincidence circuits produces a unit time delay. The pulse signals employed to energize this above-described portion of the circuit of FIG. 7 will be seen to originate from the central portion of the circular area, and the upper and lower portions are handled by the right-hand part of the circuit of FIG. 7.

Recognition of the right and left portions of the circle or symbol is achieved by the upper right-hand portion of the circuit of FIG. 7. Thus, there will be seen to be provided unit delay circuits 211, 212, 213 and 214, to which are fed the pulse signals $a3$, $e3$, $g3$ and $k3$. The output signals from these unit delay circuits are all applied to the input of a quadruple coincidence circuit 216. Also applied as inputs to this latter-mentioned coincidence circuit are the pulse signals $f4$ and $l4$. Consequently, the coincidence of any four of the six pulse signals fed into this coincidence circuit 216 will produce an output pulse, and same is fed in part to the input of a dual coincidence circuit 217, which is also fed from the output of the triple coincidence circuit 207. There will thus be produced an output signal from this circuit 217 upon the coincidence in delay space of signals in pulse lines $b$, $h$, $c$, $i$, $d$, and $j$ simultaneously with the coincidence in delay space of signals in any four of the six pulse lines $a$, $e$, $g$, $k$, $f$, and $l$. With regard to the identification of a $\theta$ symbol as compared to a circular symbol, the output of the quadruple coincidence circuit 216 is also applied through a delay circuit 217 to a bridge reject circuit or anti-coincidence circuit 218. This latter circuit 218 may be identical to the one described above, in that there is produced an output signal when there is received a stimulating signal on the input line marked with an arrow and in the absence of an input signal on the line marked with a circle. In this instance, the coincidence circuit 217 is connected to the reject input terminal of the anti-coincidence circuit 218, so that if a circle signal is produced from the coincidence circuit 218 it will prevent the passage of a $\theta$ signal through the anti-coincidence circuit 218.

The particular circuitry illustrated in FIG. 7 and briefly described above, will be noted to be only exemplary of one possible arrangement for providing recognition signals for circles and $\theta$ symbols, inasmuch as numerous alternatives are possible. Also, it will be appreciated that advantage may lie in providing for the cancellation of the circle recognition signal upon the presence of a $\theta$ recognition signal, and such may be readily accomplished. One point that may be noted about the circuitry of FIG. 7 is that a substantial amount of tilt invariance is built into the recognition. Thus, the cross portion of the $\theta$ symbol may be tilted at an angle up to 30° to horizontal, and yet the symbol will be recognized. That this is true may be appreciated by a further consideration of the illustration of FIG. 6, wherein the pulse lines are geometrically arranged in representative relationship to the actual positioning of the photoreceptors for ease of understanding of the invention.

A more generalized consideration of the comparison between image signals and stored information shows that there are available various alternatives to the prewired coincidence circuitry described above. For example, there may be employed a digital computer type of operation as diagrammatically illustrated in FIGS. 8 and 9. The memory system of a digital computer 301 may be utilized to store recognition information in such as a binary code, so that comparisons may be made between similarly coded signals from an image viewed and the coded memory information. A much larger amount of input information may be readily handled by utilizing a computer operations, and there may be actually employed conventional digital computers as, for example, an IBM 709 computer. Such a calculator with a digital code of twenty-seven bits plus sign and floating decimal point may be used with a matrix having some 729 delay space elements. Suitable binary coding may be employed for differentiation to minimize the requisite number of photocells. Thus, if all unit bits which do not neighbor zero bits are taken as zero, and all unit bits which are adjacent unit bits are taken as unit bits, there results a binary coding representative of image edges, much as described above.

The foregoing may be further clarified by considering as an example the four-by-four polar coordinate delay space of FIG. 9 with the letter V centered therein, as shown. Signals are assumed to be traveling unidirectionally outwardly along the four delay lines $w$, $x$, $y$ and $z$, and line $w$ will deliver all zeros, as the figure V does not intersect the line. The line $x$ will deliver the signals 0100, reading from right to left in time. The image code is synchronized with a clock, so that the output code taken in clockwise order from the top, with each row of the matrix taken in order, is:

0000
1000
0100
1000

By employing a floating decimal point operation, the number of columns is reduced through elimination of all zeros to the right of the first non zero bit in the matrix. The image code of the letter V thus reduces to:

00
10
01
10

This code will be seen to be exactly the same for a letter V of different size.

The latitude of operations available with digital computers is particularly advantageous with the recognition system hereof. There is attained by the combination a large storage capacity for memory codes, a simplicity of "learning" or memory input, a simplicity of storage for partial recognition, and a flexibility in programming for smoothing and interpolation. Input codes from the photoreceptor matrix applied through shift registers for matrix reduction are stored in such as rectangular ferrite memory planes. Such input codes are first passed through a recognition procedure, i.e., comparison with previously stored codes, so that no unnecessary redundancy of stored information occurs. Reading or recognition may be accomplished by comparison procedures, such as subtracting the input matrix from the memory matrix to produce an output signal for differences within a predetermined error range. Such output signals are individually characteristic of separate computer addresses, so as to identify the input in desired terms. Failure to achieve a matching in the comparison results in the input figure code being stored as a newly learned memorized item in the computer. The application of particular significance to this new address then completes a "learning" operation of the system.

The provision of recognition information or memory to the invention hereof may be accomplished by the appropriate combination of circuits of the type briefly described above, or by digital computers. It will, of course, be appreciated that maximized recognition may be attained by a maximization of the number of photoreceptors, and that for particular applications it may be well worth-while to provide a very large multitude of photoreceptors. Alternatively, it is possible, as herein indicated, to provide for the recognition of a relatively large number of symbols with a relatively few photoreceptors appropriately systemized in accordance herewith. In this respect, it is particularly noted that the utilization of delay space herein provides for a material simplification of recognition, for not only does this concept afford size invariant recognition, but furthermore, materially simplifies the recognition procedure. While it is not intended herein to indicate that the present invention may be very simply designed and constituted, insofar as the number of components required in order to produce extreme recognition qualities, it is pointed out that the present invention provides an analog of the human recognition system. It is possible, in accordance herewith, to approach the recognition capabilities of the human.

Contrasted to conventional equipment systems and methods, the present invention provides a very material step forward in the art. Thus, while existing computers, and the like, are capable of scanning a set of standardized symbols and interpreting the symbols in a unique manner to produce specific read-out patterns, the present invention does not have the limitations of these prior-art devices. Applicability of the present invention is widespread, for the invention is capable of recognizing symbols and forms to the extent that memory information is provided to the invention. Limitations upon placement, size, and angular orientation of symbols or forms to be recognized are not herein controlling. In analogy to the human eye, the present invention accommodates for the variations occurring in the normal processes to yet produce recognition of symbols or characters without the limitations of conventional machines. It is well recognized that present day machine recognition or identification is extremely limited, and this is well represented by the limitations found in the most advanced apparatus of the check-reading type, for example. Although it is undoubtedly true that recognition procedures of an extent comparable with that of human recognition would entail tremendous complexity of circuitry and components herein, it yet follows that truly amazing advances in recognition procedures are possible, in accordance herewith, while yet maintaining sufficient simplicity for practicality.

What is claimed is:

1. An electronic recognition system comprising a plurality of photoreceptors individually producing electrical signals in response to incident light, means periodically activating said receptors to produce pulsed signals therefrom, means centering said plurality of receptors upon an image to be recognized, a plurality of differentiation circuits each individually connected to a plurality of adjacent receptors for producing pulses responsive to borderlines between light and dark portions of the image viewed, a plurality of delay lines, each line connecting successive differentiation circuits from radially-spaced photoreceptors in separate segments of the plurality thereof whereby all differentiated signals in each segment of photoreceptors arrive at a common point in time-spaced relation, and means continuously comparing signals at the common points of said segments with predetermined signal codes to produce coincidence signals representative of identities between photoreceptor signals and signal codes corresponding to particular images.

2. A recognition system as set forth in claim 1, further defined by said photoreceptors being disposed in an array divided into an even number of like separate portions about the center thereof, means comparing photoreceptor signals from diametrically opposite portions of said array to produce difference signals, means mounting said array for movement, and means moving said array to minimize said difference signals for centering said array upon images viewed thereby.

3. A recognition system as set forth in claim 1, further characterized by a digital computer having memory and comparison means, means converting signals from said photoreceptor segments into binary coded signals, means applying said binary signals to said computer for comparison with stored codes therein and for retention as additional codes in the absence of a coincidence with such stored codes, and means producing characteristic signals responsive to identities between input binary coded signals and stored codes as identification of images represented by stored codes.

4. A recognition system comprising an array of photoreceptors periodically energized to individually produce pulse signals responsive to incident light, a plurality of unidirectional delay lines individually interconnecting predetermined pluralities of photoreceptors of said array to produce at the output of each, time-delayed and spaced pulses representative of photoreceptor activation, and a plurality of different compound coincidence circuits connected between the outputs of said delay lines with each of said coincidence circuits being individually compounded of means including gate and delay circuits connected with respect to said array for passing an identification signal in response to energization by a predetermined sequence of input signals produced by a certain image viewed by said array.

5. A recognition system as set forth in claim 4, further defined by a plurality of differentiation circuits each individually connected to a small plurality of adjacent photoreceptors of said array for producing pulse signals responsive to differences between photoreceptor signals and connected to said delay lines, whereby said delay lines are energized by pulses representative of borderlines between light and dark upon the array.

6. A recognition system comprising a memory unit adapted to store a large plurality of image codes and to scan same for comparison of an input code therewith and to produce output signals characteristic of identities with separate, stored codes, an array of photoreceptors periodically energized to produce output pulses responsive to activation by light, means directing said array upon images to be recognized for actuation of individual photoreceptors in accordance with the image configuration, said array being segmented into a plurality of separate portions, means combining photoreceptor pulses of individual segments in time-delayed relation to each other to produce size invariant image codes of pulses, and means applying said image codes to said memory unit for comparison with stored image codes whereby output signals identify images viewed by said array.

7. A recognition system as set forth in claim 6, further characterized by said array having drive means engaging same for directing the array upon images to be viewed and recognized, and control means energizing said drive means and including signal difference circuitry connected to diametrically opposed portions of the array for centering the array with respect to the image viewed at minimum differences of signals from such opposite portions of the array.

8. A recognition system comprising an array of photoreceptors adapted for viewing objects to be recognized, means periodically energizing said photoreceptors to produce pulsed signals therefrom in response to incident light, means differentiating said signals to produce pulses responsive to borderlines between activated and unactivated photoreceptors, a plurality of unidirectional delay lines interconnecting differentiation means from radially aligned photoreceptors whereby pulsed signals from an image are expanded in time to attain a size invariant signal relationship for each image configuration, and means producing a signal responsive to each identity of time-delayed image signals and a preset signal relation representative of particular image configurations as a recognition of the latter.

9. An electronic recognition system comprising an array of photoreceptors producing signal pulses in response to light activation from an object viewed by the array as an image code, a polar arrangement of unidirectional delay circuits individually connected to radially-aligned photoreceptors for expanding in time the segmented image code whereby size invariance thereof is attained, means storing image codes, means comparing image codes from said array with said stored codes, and means producing identifying signals upon coincidences from said comparison as recognition signals of objects viewed by the photoreceptor array.

References Cited by the Examiner

UNITED STATES PATENTS

| | | | |
|---|---|---|---|
| 2,838,602 | 6/1958 | Sprick | 178—15 |
| 2,932,006 | 4/1960 | Glauberman | 340—149.1 |

MALCOLM A. MORRISON, *Primary Examiner.*

NEIL C. READ, *Examiner.*

S. M. URYNOWICZ, J. S. IANDIORIO, *Assistant Examiners.*